(12) United States Patent
Yamagami et al.

(10) Patent No.: US 6,893,348 B2
(45) Date of Patent: May 17, 2005

(54) GAME APPARATUS AND GAME PROGRAM

(75) Inventors: Hitoshi Yamagami, Kyoto (JP); Yutaka Hirata, Tokyo (JP)

(73) Assignee: Nintendo Co., Ltd., Kyoto (JP)

( * ) Notice: Subject to any disclaimer, the term of this patent is extended or adjusted under 35 U.S.C. 154(b) by 283 days.

(21) Appl. No.: 10/340,797

(22) Filed: Jan. 13, 2003

(65) Prior Publication Data

US 2003/0134681 A1 Jul. 17, 2003

(30) Foreign Application Priority Data

Jan. 11, 2002 (JP) ........................................ 2002-005212

(51) Int. Cl.[7] .............................................. A63F 13/00
(52) U.S. Cl. ............................. 463/43; 463/40; 463/41; 705/27; 700/92
(58) Field of Search ............................. 700/91, 92, 93, 700/90; 705/27, 14; 463/7, 9, 29, 37, 38, 40, 41, 43, 44, 47

(56) References Cited

U.S. PATENT DOCUMENTS

| | | | | |
|---|---|---|---|---|
| 4,335,809 A | * | 6/1982 | Wain ............................ | 463/20 |
| 5,453,928 A | * | 9/1995 | Kaminkow et al. ............. | 463/25 |
| 5,519,433 A | * | 5/1996 | Lappington et al. ........ | 725/110 |
| 5,768,382 A | * | 6/1998 | Schneier et al. ............. | 380/251 |
| 5,983,196 A | * | 11/1999 | Wendkos ...................... | 705/14 |
| 6,270,402 B1 | * | 8/2001 | Fujioka et al. ................. | 463/2 |
| 6,312,336 B1 | * | 11/2001 | Handelman et al. .......... | 463/40 |
| 6,319,119 B1 | * | 11/2001 | Konoe et al. ................... | 463/2 |
| 6,347,993 B1 | * | 2/2002 | Kondo et al. .................. | 463/1 |
| 6,352,479 B1 | * | 3/2002 | Sparks, II ..................... | 463/42 |
| 6,386,980 B1 | * | 5/2002 | Nishino et al. ................ | 463/43 |
| 2001/0031665 A1 | * | 10/2001 | Taho et al. .................... | 463/43 |
| 2002/0086734 A1 | * | 7/2002 | Krishnan et al. .............. | 463/43 |
| 2002/0094871 A1 | * | 7/2002 | Luciano et al. ................ | 463/43 |
| 2002/0137565 A1 | * | 9/2002 | Blanco ......................... | 463/46 |
| 2002/0198053 A1 | * | 12/2002 | Yamaoka et al. .............. | 463/42 |
| 2003/0036431 A1 | * | 2/2003 | Futatsugi et al. .............. | 463/43 |

FOREIGN PATENT DOCUMENTS

JP 09276549 A * 10/1997 ........... A63F/09/22

OTHER PUBLICATIONS

Morgan, D. "Mario Party 3 FAQ" published May 2001 and printed from http://faqs.ign.com/articles/377/377674p1.html, pp. 1–30.*

* cited by examiner

Primary Examiner—Derris H. Banks
Assistant Examiner—Jason Skaarup
(74) Attorney, Agent, or Firm—Nixon & Vanderhye P.C.

(57) ABSTRACT

A plurality of programs (a plurality of games) are provided, which are classified so as to each belong to one of a plurality of channels (a plurality of game groups). When a player plays one of the programs, predetermined points in accordance with the playing result are added to channel points for the channel to which the program belongs. Stipulated points are prescribed for each program. When the channel points for the channel to which a program belongs has become equal to or greater than the stipulated points for the program, the program is newly added to the TV program table (game selection screen). As a result, new games are allowed to appear on the game selection screen with various timings and in various orders.

12 Claims, 15 Drawing Sheets

F I G. 2
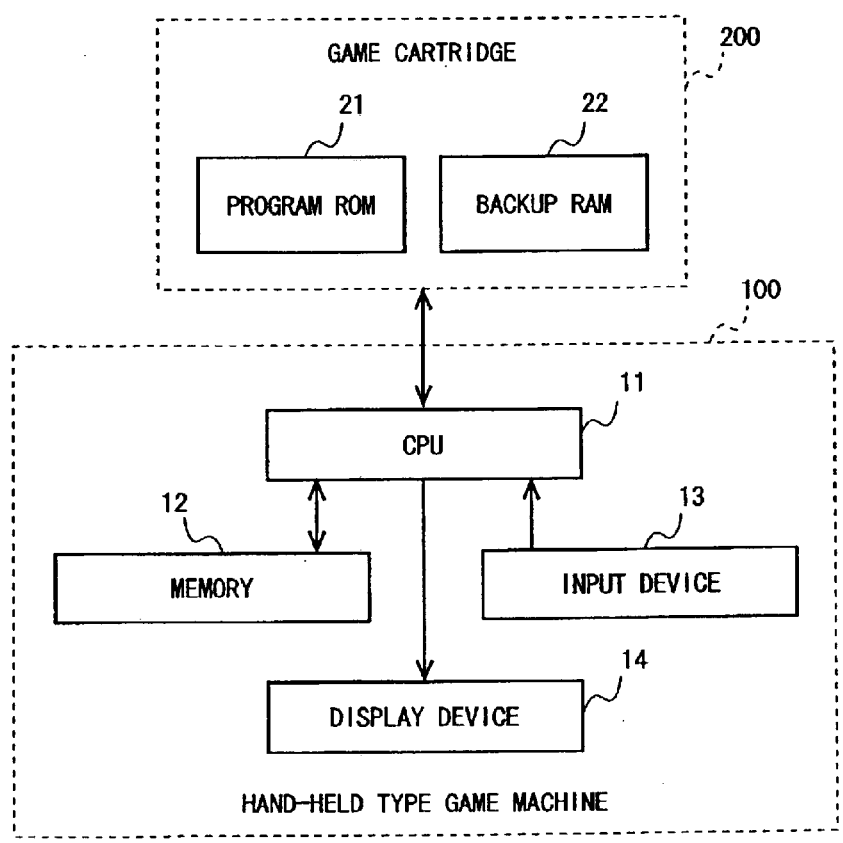

FIG. 4

| | CHANNEL 1 | CHANNEL 2 | CHANNEL 3 | CHANNEL 4 | CHANNEL 5 | CHANNEL 6 |
|---|---|---|---|---|---|---|
| 6 | TV PROGRAM 1 | TV PROGRAM 6 | TV PROGRAM 12 | TV PROGRAM 17 | TV PROGRAM 23 | TV PROGRAM 27 |
| | TV PROGRAM 2 | TV PROGRAM 7 | TV PROGRAM 13 | | | |
| | TV PROGRAM 3 (NEWS) | TV PROGRAM 8 | TV PROGRAM 14 (NEWS) | TV PROGRAM 18 | TV PROGRAM 24 | TV PROGRAM 28 |
| 12 | TV PROGRAM 4 | TV PROGRAM 9 | TV PROGRAM 15 | TV PROGRAM 19 (NEWS) | | TV PROGRAM 29 (NEWS) |
| | | | | TV PROGRAM 20 | TV PROGRAM 25 | |
| | TV PROGRAM 5 | TV PROGRAM 10 | TV PROGRAM 16 | TV PROGRAM 21 | | TV PROGRAM 30 |
| 18 | | TV PROGRAM 11 (NEWS) | | TV PROGRAM 22 | TV PROGRAM 26 (NEWS) | |

FIG. 5

| CHANNEL (GAME GROUP) | TV PROGRAM (GAMES) |
|---|---|
| CHANNEL 1 | TV PROGRAM 1 ~ TV PROGRAM 5 |
| CHANNEL 2 | TV PROGRAM 6 ~ TV PROGRAM 11 |
| CHANNEL 3 | TV PROGRAM 12 ~ TV PROGRAM 16 |
| CHANNEL 4 | TV PROGRAM 17 ~ TV PROGRAM 22 |
| CHANNEL 5 | TV PROGRAM 23 ~ TV PROGRAM 26 |
| CHANNEL 6 | TV PROGRAM 27 ~ TV PROGRAM 30 |

FIG. 6

| | CHANNEL 1 | CHANNEL 2 | CHANNEL 3 | CHANNEL 4 | CHANNEL 5 | CHANNEL 6 |
|---|---|---|---|---|---|---|
| 6 | TV PROGRAM 1 | --- | TV PROGRAM 12 | --- | --- | TV PROGRAM 27 |
| 12 | TV PROGRAM 3 (NEWS) | --- | TV PROGRAM 13 | --- | TV PROGRAM 24 | --- |
|  |  | --- (CURSOR) | TV PROGRAM 14 (NEWS) | --- |  |  |
|  |  | TV PROGRAM 10 |  | --- |  | TV PROGRAM 29 (NEWS) |
| 18 | --- | TV PROGRAM 11 (NEWS) | --- | --- | TV PROGRAM 26 (NEWS) | --- |

FIG. 8

| | CHANNEL 1 | CHANNEL 2 | CHANNEL 3 | CHANNEL 4 | CHANNEL 5 | CHANNEL 6 |
|---|---|---|---|---|---|---|
| 6 | TV PROGRAM 1 | TV PROGRAM 6 | TV PROGRAM 12 | --- | --- | TV PROGRAM 27 |
| | | | TV PROGRAM 13 | --- | --- | |
| 12 | TV PROGRAM 3 (NEWS) | --- | TV PROGRAM 14 (NEWS) | --- | TV PROGRAM 24 | |
| | CURSOR | --- | --- | --- | | --- |
| | | TV PROGRAM 10 | --- | --- | | TV PROGRAM 29 (NEWS) |
| 18 | TV PROGRAM 5 | TV PROGRAM 11 (NEWS) | --- | --- | TV PROGRAM 26 (NEWS) | --- |

F I G. 9

| TV PROGRAMS (GAMES) | STIPULATED POINTS |
|---|---|
| TV PROGRAM 1 | --- |
| TV PROGRAM 2 | 8000 |
| TV PROGRAM 3 | --- |
| TV PROGRAM 4 | 13000 |
| TV PROGRAM 5 | 4000 |
| TV PROGRAM 6 | 2000 |
| TV PROGRAM 7 | 20000 |
| TV PROGRAM 8 | 15000 |
| TV PROGRAM 9 | 6500 |
| TV PROGRAM 10 | --- |
| TV PROGRAM 11 | --- |
| TV PROGRAM 12 | --- |
| TV PROGRAM 13 | 2000 |
| TV PROGRAM 14 | --- |
| TV PROGRAM 15 | --- |
| TV PROGRAM 16 | 5000 |
| ⋮ | ⋮ |
| TV PROGRAM 30 | 6500 |

F I G. 10

| CHANNEL (GAME GROUP) | CHANNEL POINTS (GROUP POINTS) | | |
|---|---|---|---|
| | BEFORE PLAYING GAME | ADDED VALUE | AFTER PLAYING GAME |
| CHANNEL 1 | 3980 | +30 | 4010 |
| CHANNEL 2 | 1723 | +1000 | 2723 |
| CHANNEL 3 | 4102 | +30 | 4132 |
| CHANNEL 4 | 330 | +30 | 360 |
| CHANNEL 5 | 3250 | +30 | 3280 |
| CHANNEL 6 | 5100 | +30 | 5130 |

F I G. 1 4
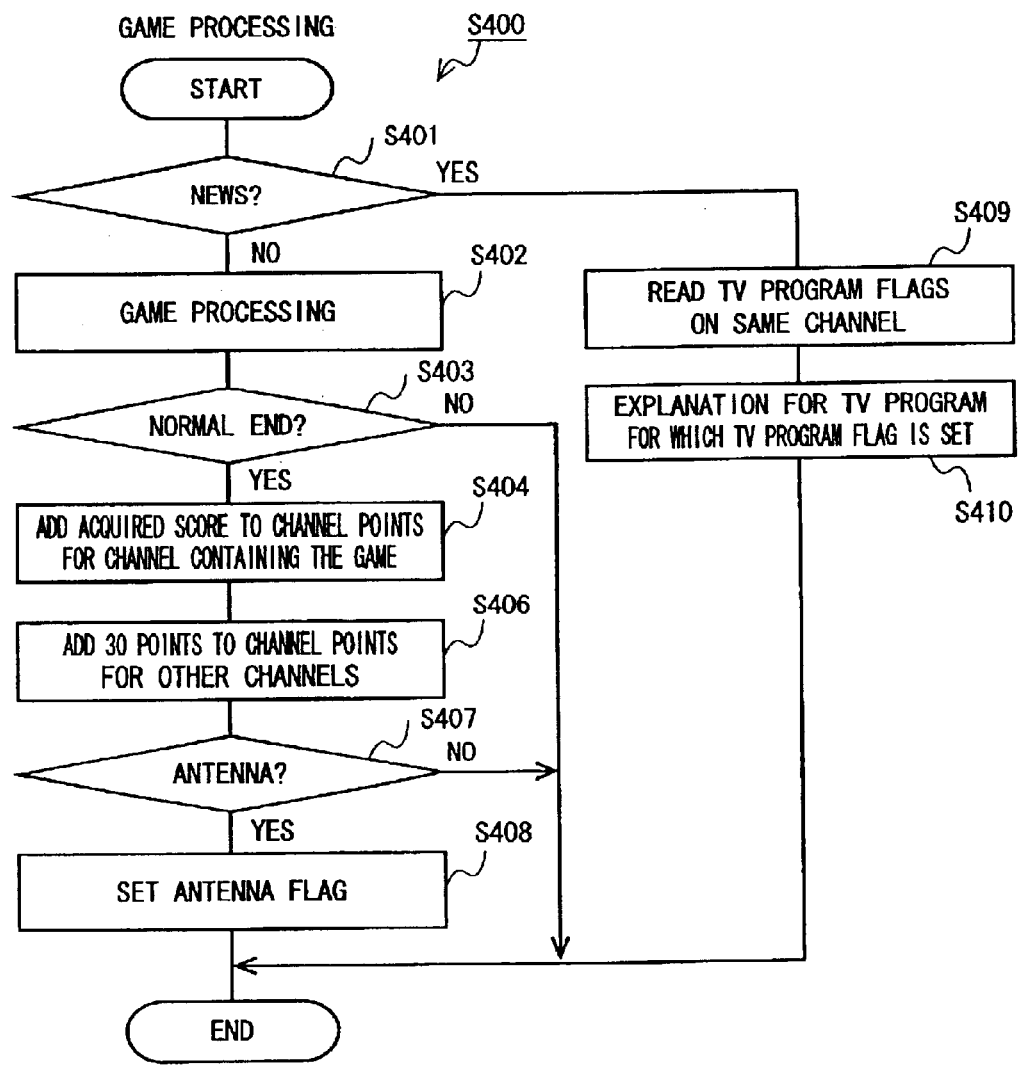

F I G. 1 5
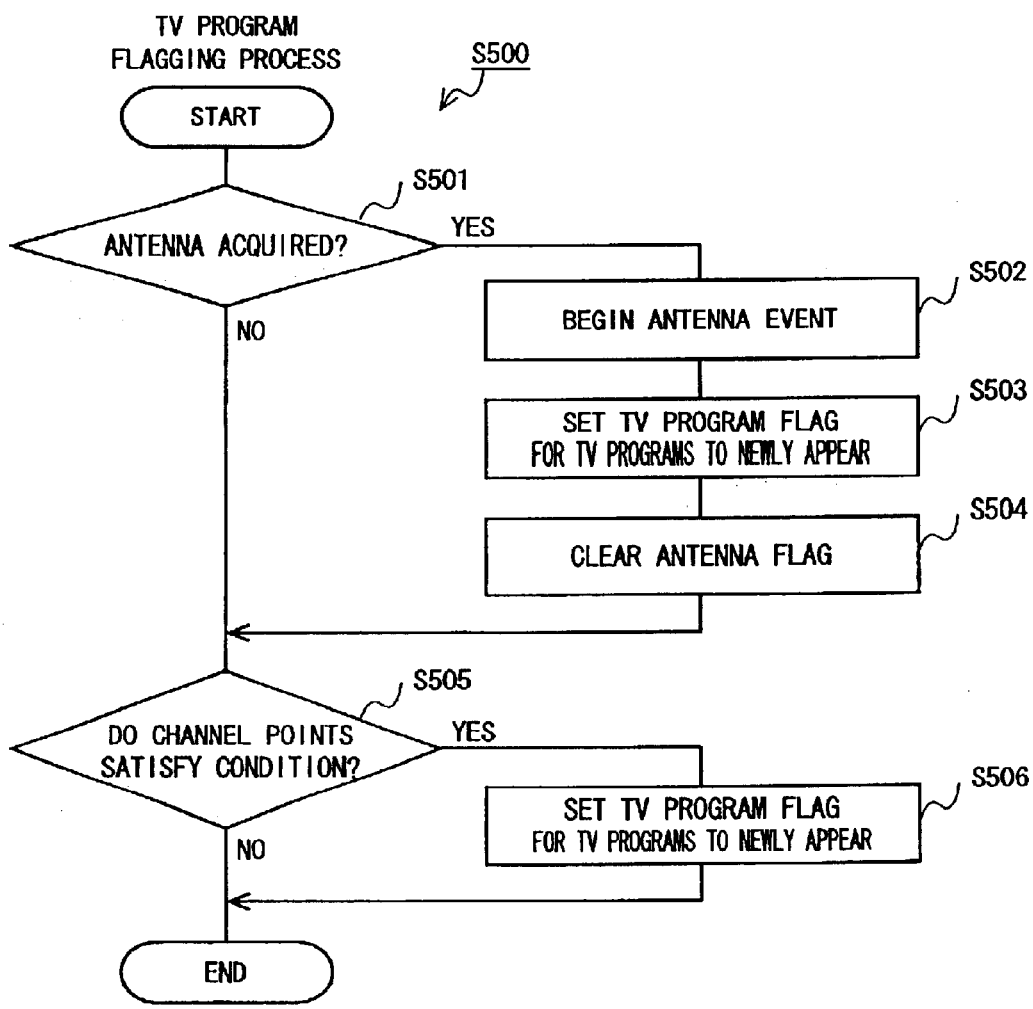

GAME APPARATUS AND GAME PROGRAM

BACKGROUND OF THE INVENTION

1. Field of the Invention

The present invention relates to a game apparatus, and more particularly to a game apparatus which causes a list of games to be displayed on a display means, such that one of the list of games that is selected by a player is executed.

2. Description of the Background Art

There is a type of games such that each game contains a number of games (so-called "mini-games"). Such a game is commonly designed so that the player is allowed to select any of the mini-games. Specifically, a player is able to play any desired mini-game that is selected typically on a game selection screen.

Some mini-game-based games are designed in such a manner that a player is not allowed to select from all of the mini-games provided in the game. In such a game, a player can only select from a limited number of mini-games at an early stage. Thereafter, as the user clears all of the mini-games which are currently allowed for selection, for example, the user is enabled to select further mini-games. Thus, the player is progressively allowed to play new mini-games. Such a game provides the player with an incentive to play further mini-games, thereby adding to the excitement of the player.

However, in such a conventional game, a condition for being entitled to selecting further mini-games (i.e., the condition for allowing further mini-games to appear on the game selection screen) is the mere clearance of all of the mini-games which are currently allowed for selection. In other words, the player can tell when such mini-games will appear, so that there is little sense of surprise for getting further mini-games on the screen.

Moreover, since the mini-games will appear according to a predetermined order, the game progress may become monotonous.

Since new mini-games will appear on the condition that the player clears all of the mini-games which are currently allowed for selection, the player will never be able to cause the new mini-games to appear on the screen even if there is one mini-game that the player cannot clear.

SUMMARY OF THE INVENTION

Therefore, an object of the present invention is to provide a game apparatus or a game program for executing a game which makes it difficult for a player to predict when new games will appear so that the player will obtain a sense of surprise when the new games do appear, and which can allow the new games to appear in various orders so as to prevent the game progression from becoming monotonous, and which does not withhold new games from appearing even if one of the games is difficult for the player to clear.

The present invention has the following features to attain the above object.

A first aspect of the present invention is directed to a game apparatus (corresponding to, e.g., a combination of a hand-held type game machine 100 and a game cartridge 200) for causing display means (e.g., a display device 14) to display, among a predetermined number of games (e.g., Programs 1 to 30) provided, a list (e.g., a TV program table) of games which are allowed for selection by a player, and executing one of the list of games selected by the player, the game apparatus comprising: stipulated point storage means (e.g., a program ROM 21 having data corresponding to FIG. 9 recorded therein), group point storage means (e.g., a channel point area 32), group point addition means (e.g., a CPU 11 executing step S404; hereinafter, only step numbers will be exemplified), game addition means (e.g., S506) and selection screen generation means (e.g., S202). Each of the predetermined number of games is previously classified so as to belong to one of a plurality of game groups (Channels 1 to 6). The stipulated point storage means stores stipulated points for each game. The group point storage means stores group points (channel points) for each game group. The group point addition means adds, in response to playing of one of the list of games by the player, predetermined points in accordance with a result of the playing to the group points for the game group to which the game belongs. When the group points for the game group to which one of the predetermined number of games belongs becomes equal to or greater than the stipulated points for the game, the game addition means newly adds the game to the list. The selection screen generation means generates image data for displaying the list on the display means. This makes it difficult for a player to predict when new games will appear so that the player will obtain a sense of surprise when the new games do appear, and allows the new games to appear in various orders so as to prevent the game progression from becoming monotonous, while not withholding new games from appearing even if one of the games is difficult for the player to clear. As used herein, the "game apparatus" is not limited to devices which are specially designed as game machines, but also encompasses a personal computer the like executing a game program.

In a second aspect, the group point addition means adds, concurrently with adding the predetermined points in accordance with the result of the playing to the group points for the game group to which the game belongs in response to playing of one of the list of games by the player, points fewer than the predetermined points to the group points for the other game groups. Thus, a player who has been playing a game belonging to a certain game group may occasionally be allowed to select new game programs belonging to another game group, thereby providing the player with a greater surprise, resulting in more excitement of the player. Even if the player finds a game currently appearing in a specific game group to be difficult or unfavorable, the play can still cause new games belong to a game group other than the game group to which the "difficult" program belongs by playing the games belonging to other game groups several times, without even playing the "difficult" game.

In a third aspect, the selection screen generation means generates the image data such that the list is displayed in the form of a TV program table, with the list of games and game groups being displayed so as to correspond to programs and channels, respectively, on the TV program table. Thus, the displaying of a TV program table, which the player is presumably familiar with, allows the player to instinctively understand the relationship between a game group and a plurality of games belonging to that game group.

In a fourth aspect, the TV program table comprises a news program (e.g., Program 3, Program 11) for notifying information concerning progression of the game in the form of news to the player when the news program is selected by the player. Thus, the news program can effectively notify the information concerning the game progression to the player in a familiar form.

These and other objects, features, aspects and advantages of the present invention will become more apparent from the following detailed description of the present invention when taken in conjunction with the accompanying drawings.

BRIEF DESCRIPTION OF THE DRAWINGS

FIG. 2 is a block diagram illustrating the structure of a game apparatus according to an embodiment of the present invention;

FIG. 4 is a diagram illustrating the structure of a TV program table;

FIG. 5 is a diagram illustrating a relationship between channels (game groups) and programs (games);

FIG. 6 is a diagram illustrating an exemplary displayed image of a TV program table;

FIG. 8 is a diagram illustrating an exemplary TV program table which may be displayed when a new program is added to the TV program table shown in FIG. 6;

FIG. 9 is a diagram for explaining stipulated points;

FIG. 10 is a diagram for explaining channel points and the changes thereof;

FIG. 14 is a flowchart illustrating the details of game processing;

FIG. 15 is a flowchart illustrating the details of a program flagging process.

DESCRIPTION OF THE PREFERRED EMBODIMENTS

Hereinafter, an embodiment of the present invention will be described with reference to the figures.

(Outlook of the Game Apparatus)

Figure 1:
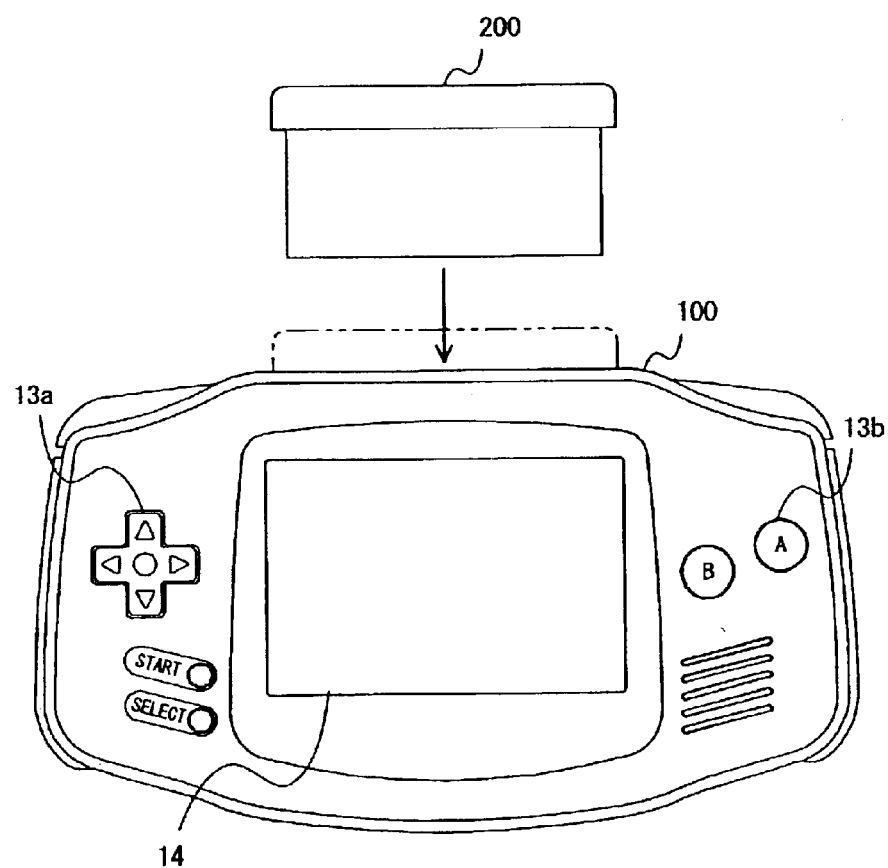
FIG. 1 is a view illustrating an overlook of a game apparatus according to an embodiment of the present invention.

FIG. 1 is a view illustrating an overlook of a game apparatus according to an embodiment of the present invention. In FIG. 1, the game apparatus comprises a hand-held type game machine 100 and a game cartridge 200. The hand-held type game machine 100 has a display device 14 and an input device, which includes a cross switch 13a and an "A" button 13b. The game cartridge 200 is detachably connected to the hand-held type game machine 100.

(Internal Structure of the Game Apparatus)

FIG. 2 is a block diagram illustrating the structure of the game apparatus. In FIG. 2, the hand-held type game machine 100 includes a CPU 11, a memory 12, an input device 13, and the display device 14. The game cartridge 200 includes a program ROM 21 and a backup RAM 22. The CPU 11 executes game processing based on a game program which is recorded in the program ROM 21, while utilizing the memory 12 as necessary. When executing game processing, the CPU 11 accepts the operation by a user which is made via the input device 13, causes game images to be displayed on the display device 14, and stores any data to be saved to the backup RAM 22 as necessary.

(Memory Map)

Figure 3:
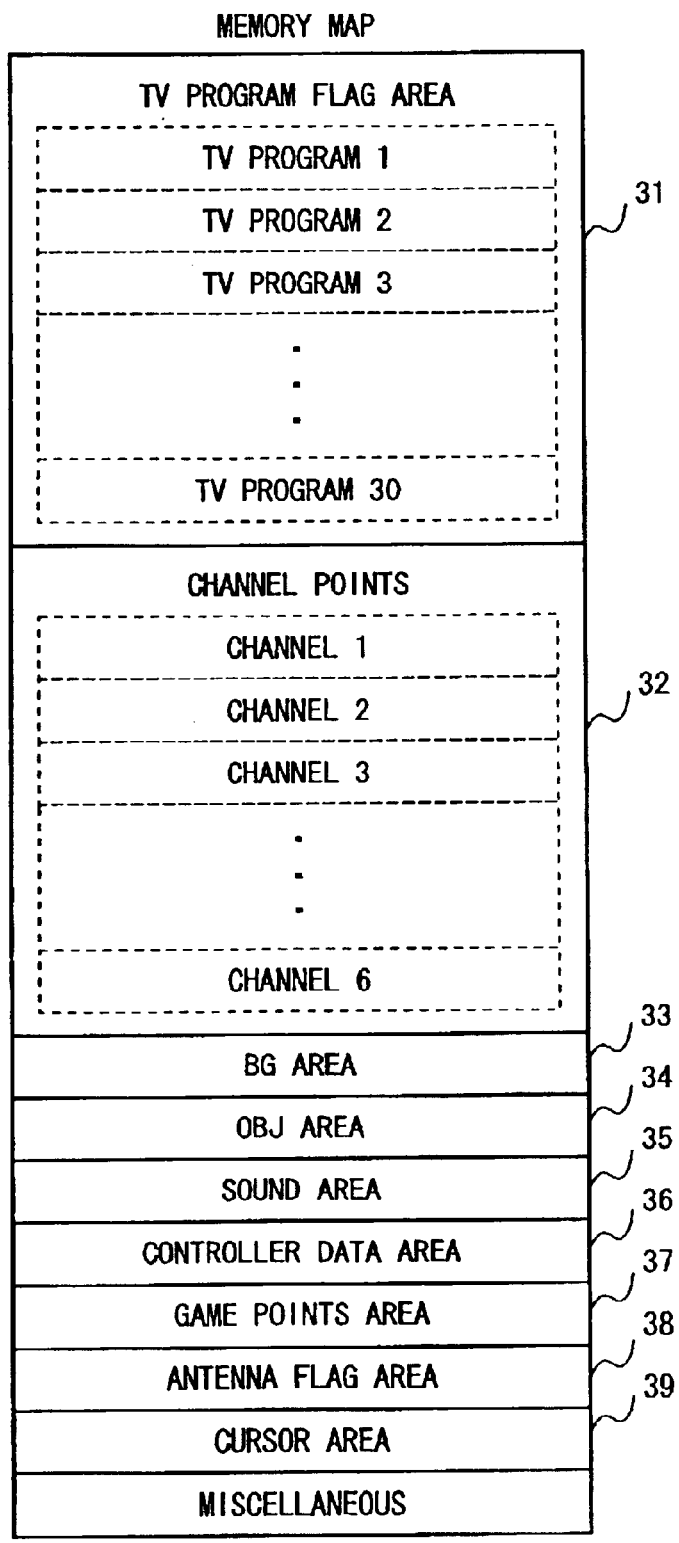
FIG. 3 is a memory map illustrating a data structure of a memory 12.

FIG. 3 is a memory map illustrating a data structure of the memory 12. The memory 12 includes a program flag area 31, a channel point area 32, a BG area 33, an OBJ area 34, a sound area 35, a controller data area 36, a game points area 37, an antenna flag area 38, and a cursor area 39. A "miscellaneous" area is also used.

The program flag area 31 is an area for storing a program flag for each program. As used herein, a "program" refers to a game (mini-game). In the present embodiment, a list of games which a player can select is displayed as a game selection screen on the display device 14, in the fashion of a television TV program table (see FIG. 4); therefore, each game is referred to as a "program". In the present embodiment, thirty kinds of games, i.e., Programs 1 to 30, are provided. The program flag is a flag which indicates whether or not a program associated with the flag is allowed for selection by the player.

The channel point area 32 is an area for storing channel points for each channel. As used herein, a "channel" refers to a game group which comprises a plurality of games (programs). As shown in FIGS. 4 and 5, a plurality of programs are provided on each channel. For example, Channel 1 refers to a game group consisting of five games of Programs 1 to 5. In the present embodiment, six channels, i.e., Channels 1 to 6, are provided. As used herein, "channel points" are points which are counted on a channel-by-channel basis, which affect the appearance of new programs (games) on the TV program table (game selection screen).

The BG area 33 is an area for storing a background image data for the TV program table. The OBJ area 34 is an area for storing object image data representing an image to be drawn upon the background image. The sound area 35 is an area for storing audio data representing game sounds which are to be outputted from the game apparatus. The controller data area 36 is an area for temporarily storing information representing an operated state of the controller (input device 13). The game points area 37 is an area for storing a score of the game. The cursor area 39 is an area for storing information representing a current position of a cursor when a player selects a program on the TV program table.

The antenna flag 38 is a flag for determining whether an "antenna", as a specific item in a game, has been obtained or not. The item "antenna" will be described later.

Thus, the structure of the game apparatus has been described. Next, the operation of the game apparatus will be described.

(Apparent Operation)

Figure 7:
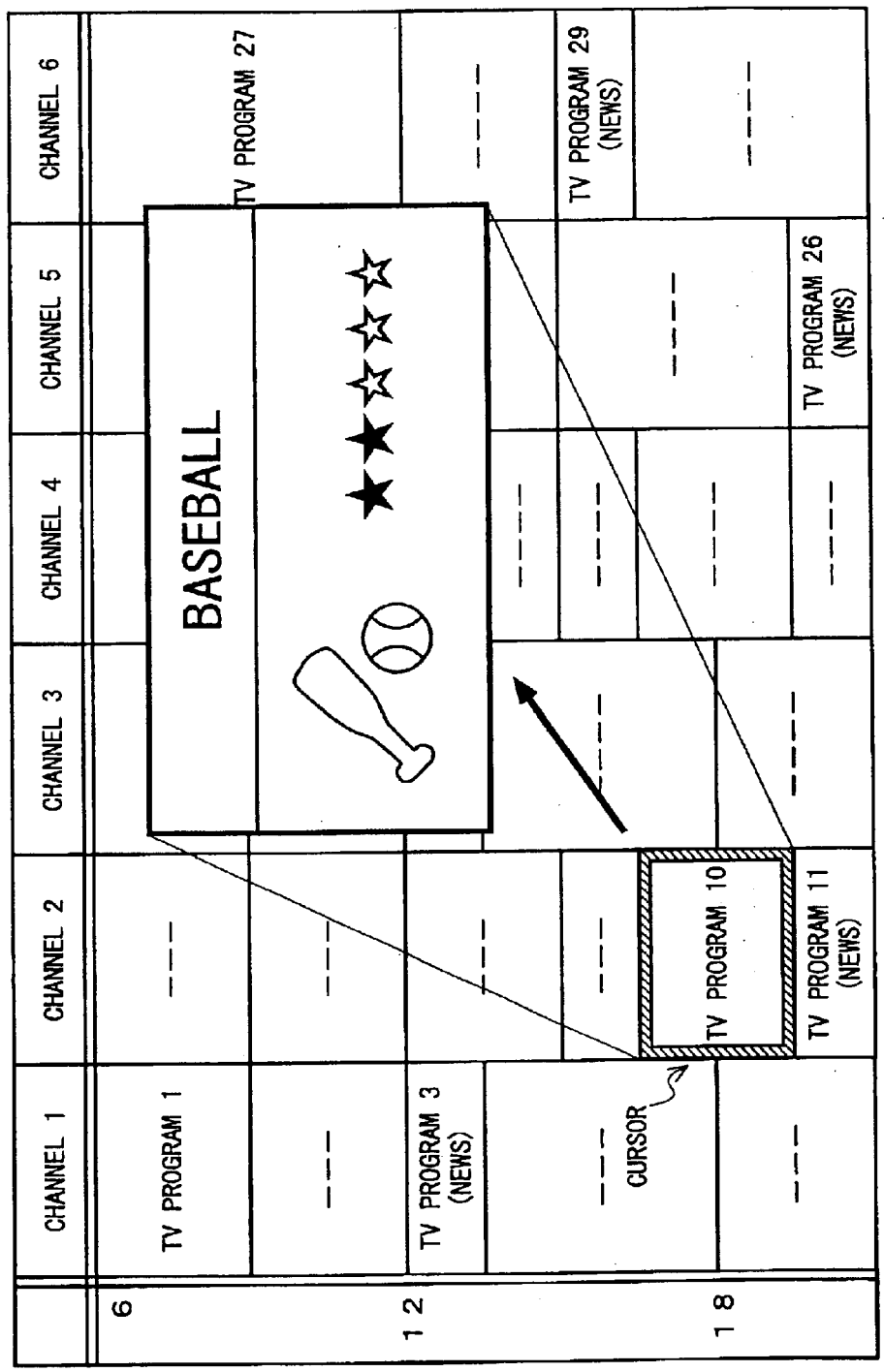
FIG. 7 is a diagram illustrating a program window.

In accordance with the game apparatus of the present embodiment, a TV program table as shown in FIG. 6 is first displayed on the display device 14. The player selects a desired program from the TV program table. However, the TV program table does not always display all of the programs provided (i.e., Programs 1 to 30). Rather, only one to several programs are initially displayed on the TV program table as games which are allowed for selection by the player. By operating the cross switch 13a of the input device 13, the player moves the cursor shown in FIG. 6 to where a desired program (which is herein assumed to be Program 10) is located. Once the cursor is moved to where Program 10 is located, as shown in FIG. 7, a program window for providing information concerning Program 10 for the player may be displayed. The program window may indicate the title of the program or the number of times the program has so far been cleared, for example. The player, upon deciding to play Program 10 by looking at the program window, presses down the "A" button 13b of the input device 13. Then, Program 10 is started, and the player plays Program 10. Once Program 10 is finished, the TV program table is again displayed on the display device 14. Depending on the playing result of Program 10, as shown in FIG. 8, new programs (e.g., Program 5 and Program 6) may appear in addition to those shown prior to playing Program 10.

As the player keeps playing the programs, the number of programs to be displayed on the TV program table will progressively increase, until all of Programs 1 to 30 are displayed on the TV program table.

(How New Programs are Added to the TV Program Table)

Next, the manner in which new programs appear on the TV program table will be described.

As shown in FIG. 9, stipulated points are previously set for each program (Programs 1 to 30), and the information thereof is recorded in the program ROM 21. As used herein, the "stipulated points" for a given program are a number of points which serves as a threshold value for the program to be displayed on the TV program table. Specifically, if channel points acquired for a channel to which a given program belongs are equal to or greater than the stipulated points for that program, the program is displayed on the TV program table. With respect to Program 5, for example, Program 5 will be displayed on the TV program table if the channel points acquired for Channel 1 are equal to or greater than the stipulated points for Program 5.

FIG. 9 shows some programs which do not have any stipulated points set therefor. The determination as to whether or not to add these programs to the TV program table is made based on a condition other than stipulated points. These programs may include, for example, programs which are added to the TV program table in accordance with the progress of the game scenario, programs which are added to the TV program table when a certain program is played at least once, programs which are added to the TV program table when a special condition is satisfied, and the like. These programs also include news programs such as Program 3 and Program 14 shown in FIG. 4, and programs which are added to the TV program table when an "antenna" is discovered during the playing of a program. One "news program" is provided for each channel, which is concurrently added to the TV program table when another program appears for the first time on that channel.

Next, the channel points will be described. When the player plays the game on the game apparatus for the first time, the channel points for each channel are "0". As the player plays the programs, predetermined points are progressively added to the channel points depending on the playing results, so that the channel points keep increasing. FIG. 10 is a diagram illustrating an example of changes which may occur in the channel points for each channel, as taken before a player plays Program 10 and after the player has played Program 10. According to the present embodiment, when a player plays a certain program, the score which has been acquired in that program is added to the channel points for the channel which the program belongs to. Furthermore, if the program has successfully been cleared without reaching a gameover, thirty points may universally be added to the channel points for all other channels as a bonus. FIG. 10 illustrates an example where the player has successfully cleared Program 10, resulting in a score of 1000 points. As a result of the player having played Program 10, the channel points for Channel 1 has changed from "3980" to "4010". Referring to the stipulated points for Programs 1 to 5 (i.e., programs on Channel 1) as shown in FIG. 9, it can be seen that Program 5 is to be newly added to the TV program table. Similarly, as for Channel 2, Program 6 is to be newly added to the TV program table. Thus, the TV program table as shown in FIG. 6 will transition to the TV program table as shown in FIG. 8.

(CPU Operation)

Next, the operation of the CPU 11 will be described with reference to the flowcharts of FIGS. 11 to 15.

Figure 11:
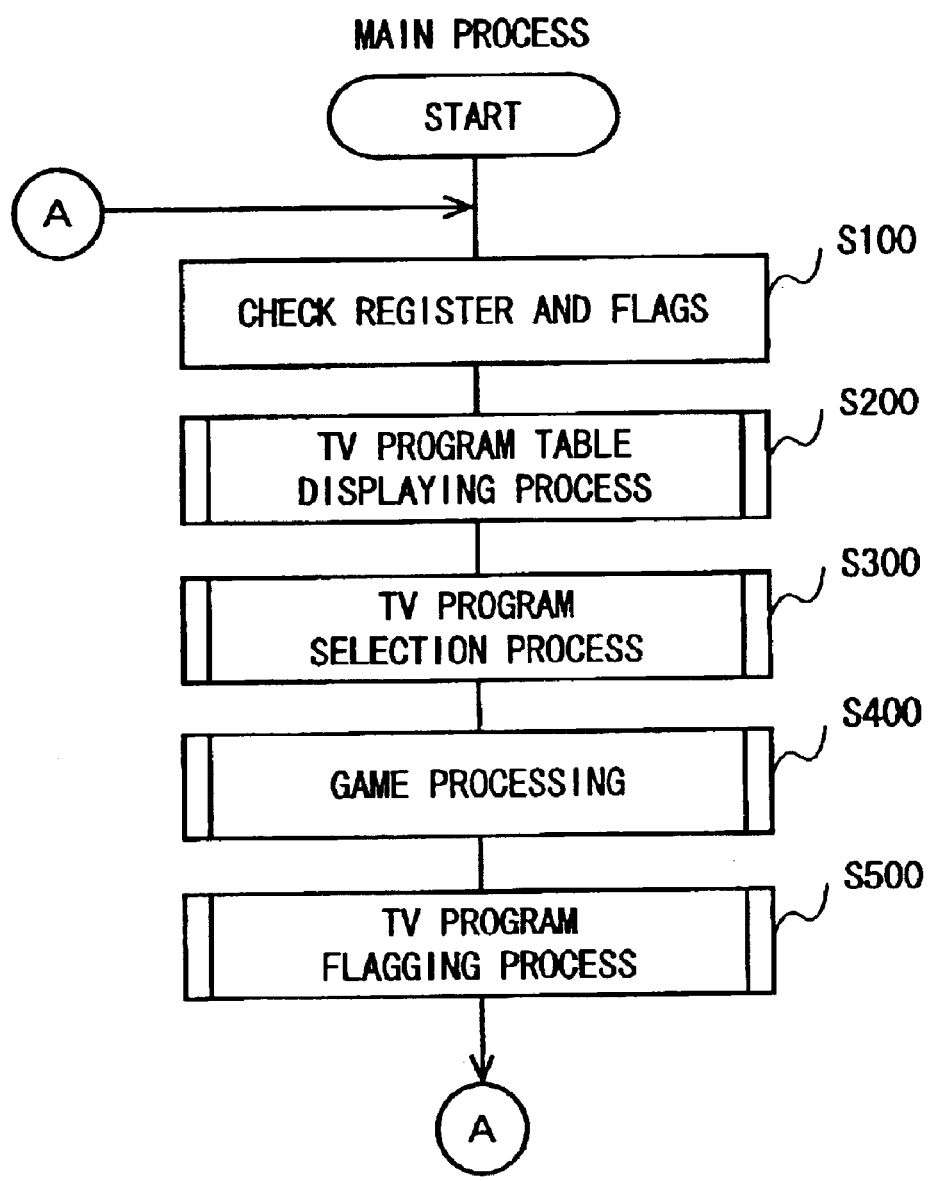
FIG. 11 is a flowchart illustrating a main process executed by a CPU 11.

FIG. 11 is a flowchart illustrating a main process which is executed by the CPU 11. In the main process, the CPU 11 first checks registers (not shown) and flags (S100). Ten, the CPU 11 executes a TV program table displaying process in order to display a TV program table on the display device 14 (S200). Next, the CPU 11 executes a program selection process for allowing a player to select a program and receiving a result of the selection (S300). Then, the CPU 11 executes game processing with respect to the program which has been selected by the player (S400). Thereafter, the CPU 11 executes a program flagging process for updating a program flag in accordance with the result of the game processing (S500), and the processing of the CPU 11 returns to step S100. Hereinafter, the processes of steps S200 to S500 will be specifically described.

Figure 12:
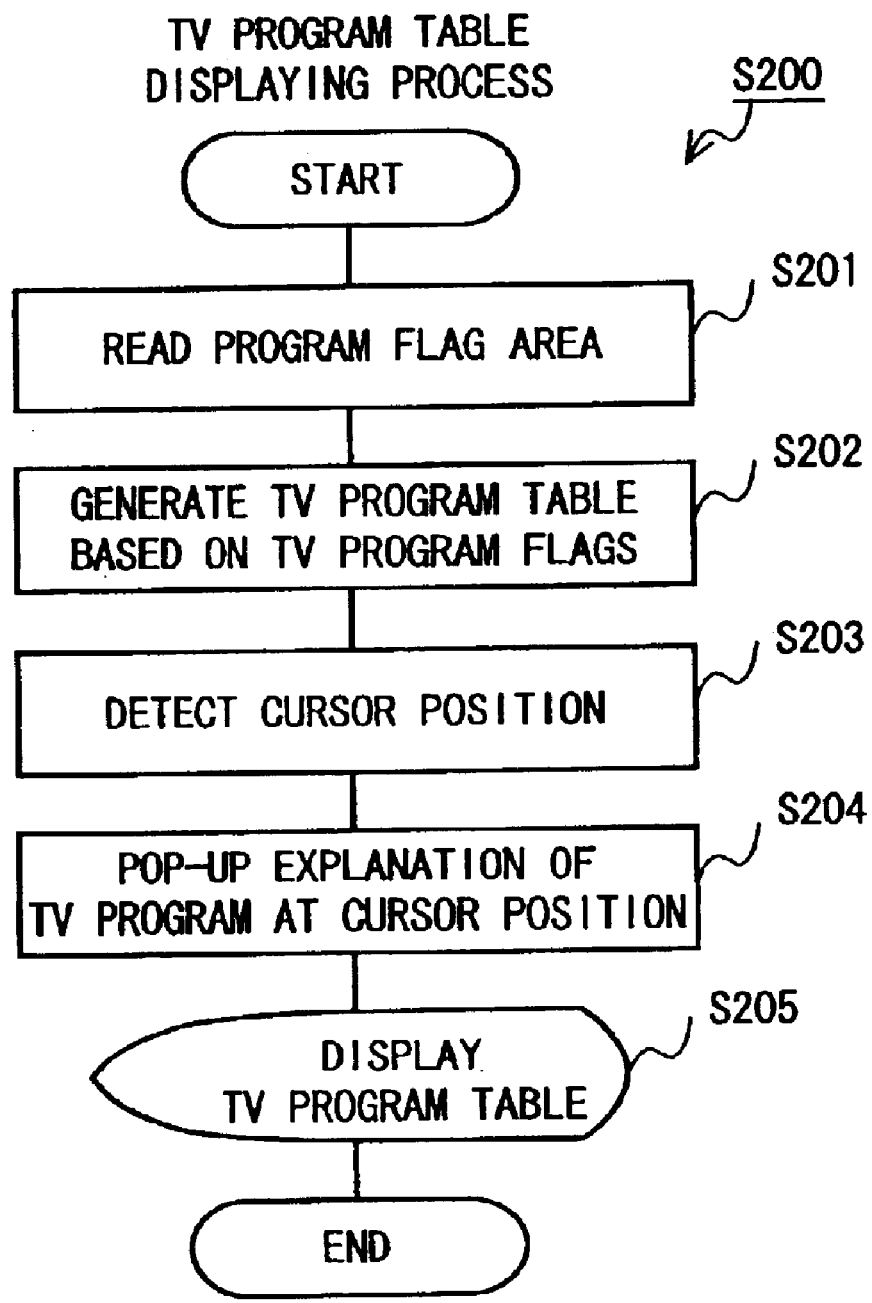
FIG. 12 is a flowchart illustrating the details of a TV program table displaying process.

FIG. 12 is a flowchart illustrating the details of the TV program table displaying process performed at step S200 of the main process (FIG. 11). When beginning the TV program table displaying process, the CPU 11 reads the program flag area 31 (S201), and generates a TV program table based on the program flags of the respective programs which have been read (S202) Herein, the CPU 11 generates a TV program table (e.g., FIG. 6) such that only those programs for which a program flag is set are displayed on the TV program table. Then, the CPU 11 detects a current cursor position (S204), and generates a program window (FIG. 7) for displaying an explanation of a program which is located at the detected cursor position. The CPU 11 causes the display device 14 to display the generated TV program table and program window (S205), thus ending the TV program table displaying process. Then, the process of the processing of the CPU 11 proceeds to step S300 of the main process (FIG. 11).

Figure 13:
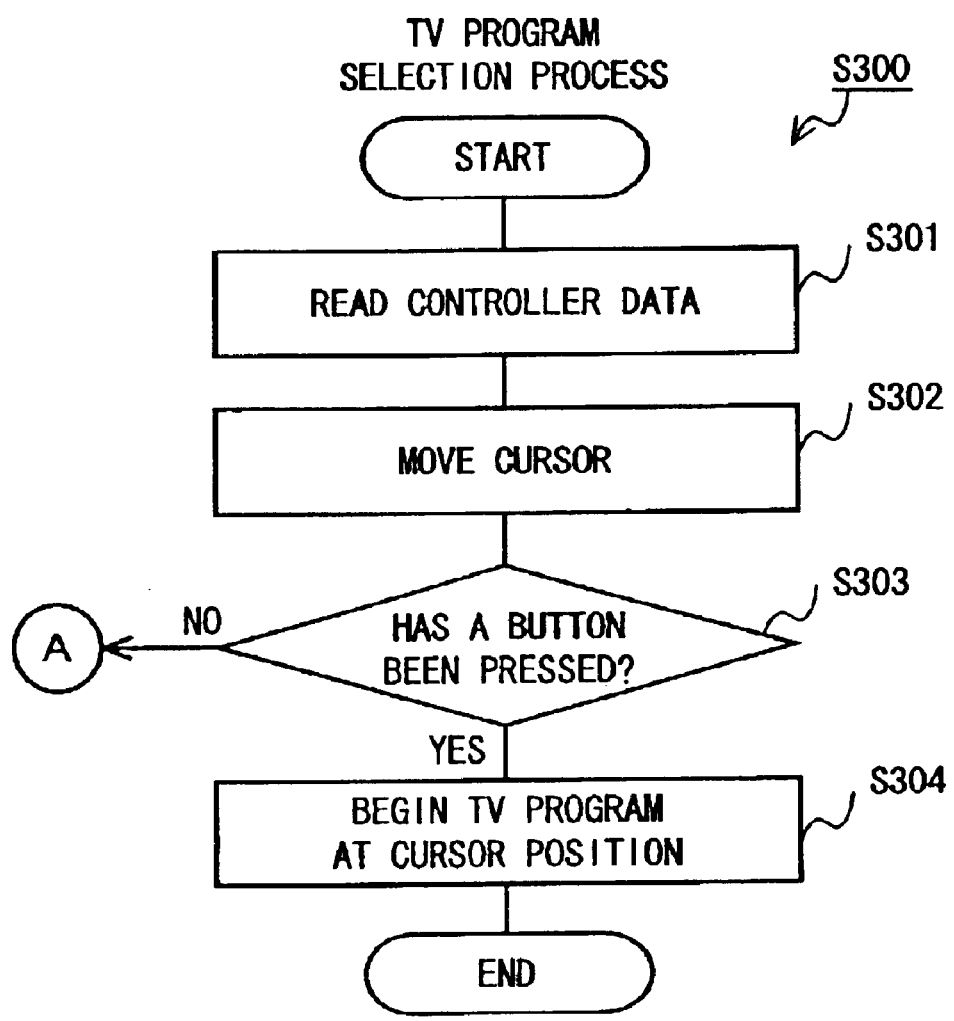
FIG. 13 is a flowchart illustrating the details of a program selection process.

FIG. 13 is a flowchart illustrating the details of the program selection process performed at step S300 of the main process (FIG. 11). When beginning the program selection process, the CPU 11 reads controller data (i.e., data representing the state of the cross switch 13*a*)(S301), and moves the cursor in accordance with the controller data which has been read (S302). If the cross switch 13*a* has been moved in a down direction by the player, for example, the cursor is moved one program down (see the movement of cursor from FIG. 6 to FIG. 7). Then, the CPU 11 determines whether a predetermined button (e.g., the "A" button 13*b*) of the input device 13 has been pressed or not (S303). If it is determined that the "A" button 13*b* has been pressed, the CPU 11 begins executing a program which is located at the cursor position (S304), thus ending the program selection process; thereafter, the processing of the CPU 11 proceeds to step S400 of the main process (FIG. 11). On the other hand, if it is determined at step S303 that the "A" button 13*b* has not been pressed, the CPU 11 ends the program selection process; thereafter, the processing of the CPU 11 returns to step S100 of the main process (FIG. 11).

FIG. 14 is a flowchart illustrating the details of the game processing performed at step S400 of the main process (FIG. 11). When beginning the game processing, the CPU 11 determines whether the program which has been selected by the player is a news program or not (S401). If it is determined to be a news program, the CPU 11 reads the program flags for the programs which are on the same channel as the news program (S409), and provides explanations of those of such program for which a program flag is set, through a displayed image on the display device 13 and/or sounds. The content of the news will vary depending on the states of the flags. For example, news on those programs which have newly been added to the TV program table can be displayed with priority. In addition to providing explanations of the programs, the news program may also notify any other information concerning the game progression to the player, e.g., channel points for the channel to which the news program belongs. When the explanations of the programs are finished, the CPU 11 ends the game processing, and the processing of the CPU 11 proceeds to step S500 of the main process (FIG. 11).

On the other hand, if it is determined at step S401 that the program which has been selected by the player is not a news program, the CPU 11 executes game processing for this program (S402). Then, the CPU 11 determines whether or not the player has not given up the game in the middle, i.e., whether the game has been brought to a normal end or not (S403). If it is determined that the game has not been brought to a normal end, the CPU 11 ends the game processing, and the processing of the CPU 11 proceeds to step S500 of the main process (FIG. 11). On the other hand, if it is determined that the game has been brought to a normal end, the CPU 11 adds the score which has been acquired by the player in the game to the channel points for the channel to which the game (program) belongs (S404), and further adds 30 points each to the channel points for all other channels (S406). Next, the CPU 11 determines whether an "antenna" has been discovered or not (S407). If it is determined that an "antenna" has been discovered, the CPU 11 sets an antenna flag in the antenna flag area 38 (S408) and then ends the game processing; thereafter, the processing of the CPU 11 proceeds to step S500 of the main process (FIG. 11). On the other hand, if it is determined that the "antenna" has been discovered, the CPU 11 ends the game processing, and the processing of the CPU 11 proceeds to step S500 of the main process (FIG. 11).

As used herein, an "antenna" is a specific item which may be discovered in the game, which will trigger new a program (s) to be added to the TV program table. The "antenna" is hidden in one of the programs, and is discovered as the player clears the program in which the "antenna" is hidden. The player does not know which program contains the "antenna" until it is discovered.

FIG. 15 is a flowchart illustrating the details of the program flagging process performed at step S500 of the main process (FIG. 11). When beginning the program flagging process, the CPU 11 determines whether the "antenna" has been acquired or not, by referring to the antenna flag area 38 (S501). If it is determined that the antenna flag is set, i.e., the "antenna" has been acquired, the CPU 11 performs event processing associated with the acquisition of the "antenna" within the game (S502), sets a program flag for the program (s) which is conditioned to be newly added to the TV program table upon acquisition of the "antenna" (S503), and clears the antenna flag (S504); thereafter, the processing of the CPU 11 proceeds to step S505. On the other hand, if it is determined at step S501 that the "antenna" has not been acquired, the processing of the CPU 11 proceeds directly to step S505. At step S505, the CPU 11 determines whether or not the channel points for each channel satisfy a condition for any programs to be newly added to the TV program table. If it is determined that the channel points for any channel satisfies such a condition, the CPU 11 sets a program flag for the program(s) which is to be newly added to the TV program table (S506), and ends the program flagging process; thereafter, the processing of the CPU 11 returns to step S100 of the main process (FIG. 11). On the other hand, if it is determined that the channel points for none of the channels satisfy such a condition, the CPU 11 ends the program flagging process, and the processing of the CPU 11 returns to step S100 of the main process (FIG. 11).

Thus, according to the present embodiment, the timing with which new programs appear is based on the relationship between channel points and stipulated points, which is more complicated than a scheme in which new programs are scheduled to appear once a given program(s) is cleared. Therefore, the player cannot easily predict when new programs will appear. Thus, the player will obtain a sense of surprise when the new games appear. Since the new games can appear in various orders depending on which channel's programs the player plays more often, so that the game progression is prevented from becoming monotonous. Even if the player finds one of the games difficult to clear, the play can still increase his/her channel points by playing programs other than that particular program, so that the new games are withheld from appearing.

Although the present embodiment illustrates an example where, as shown in FIGS. 10 and 14, playing a given program also results in the addition of 30 points to the channel points for channels not even containing that program, the present invention is not limited thereto. However, note that the illustrated game arrangement is preferable because a player who has been playing a program on a certain channel may occasionally get programs on another channel to appear, thereby providing the player with a greater surprise, resulting in more excitement of the player. The illustrated game arrangement also produces an advantage in that, even if the player finds a program currently appearing on a specific channel to be difficult or unfavorable, the play can still cause new programs to appear on the channel to which the "difficult" program belongs by playing the programs on other channels several times, without even playing the "difficult" program. In view of various advantages, it is preferable that the points which are added, as a result playing a given program, to the channel points for channels not containing that program (i.e., the points added at step S406) are at least smaller than the points which are added to the channel points for the channel to which that program belongs (i.e., the points added at step S404).

Although the present embodiment illustrates an example where the game selection screen is displayed in the fashion of a TV program table, the present invention is not limited thereto. However, note that the illustrated game arrangement is preferable because the displaying of a TV program table, which the player is presumably familiar with, would allow the player to instinctively understand the relationship between a game group and a plurality of games belonging to that game group.

Although the present embodiment illustrates an example where information concerning the game progression is notified to the player in the form of a news program, the present invention is not limited thereto. However, note that the illustrated game arrangement is preferable because it can effectively notify the information concerning the game progression to the player in a familiar form.

Although the present embodiment illustrates an example where the game apparatus includes the display device 14, the present invention is not limited thereto. Alternatively, a image signal may be supplied to an external display means such as a TV monitor, e.g., in the case of a non-handheld type game machine. Although the present embodiment illustrates an example where the game program is supplied in the form of the game cartridge 200, the present invention is not limited thereto. Alternatively, the game program may be supplied in the form of any other storage medium, e.g., an optical disk. Moreover, the game program maybe supplied directly from a storage medium, or indirectly supplied via a transmission medium, e.g., in the form of a program which is downloaded for execution via the Internet. Furthermore, some of the functions which are realized by the CPU 11 executing the game program in the present embodiment may alternatively be realized by hardware means.

While the invention has been described in detail, the foregoing description is in all aspects illustrative and not restrictive. It is understood that numerous other modifications and variations can be devised without departing from the scope of the invention.

What is claimed is:

1. A game apparatus for causing display means to display, among a predetermined number of games provided, a list of games which are allowed for selection by a player, and executing one of the list of games selected by the player, wherein each of the predetermined number of games is previously classified so as to belong to one of a plurality of game groups, the game apparatus comprising:

stipulated point storage means for storing stipulated points for each game, group point storage means for storing group points for each game group, group point addition means for adding, in response to playing of one of the list of games by the player, predetermined points in accordance with a result of the playing to the group points for the game group to which the game belongs, game addition means for, when the group points for the game group to which one of the predetermined number of games belongs becomes equal to or greater than the stipulated points for the game, newly adding the game to the list, and selection screen generation means for generating image data for displaying the list on the display means.

2. The game apparatus according to claim 1, wherein the group point addition means adds, concurrently with adding the predetermined points in accordance with the result of the playing to the group points for the game group to which the game belongs in response to playing of one of the list of games by the player, points fewer than the predetermined points to the group points for the other game groups.

3. The game apparatus according to claim 1, wherein the selection screen generation means generates the image data such that the list is displayed in the form of a TV program table, with the list of games and game groups being displayed so as to correspond to programs and channels, respectively, on the TV program table.

4. The game apparatus according to claim 3, wherein the TV program table comprises a news program for notifying information concerning progression of the game in the form of news to the player when the news program is selected by the player.

5. A game program which is recorded on a computer-readable storage medium and executed by a game apparatus for causing a display to display, among a predetermined number of games provided, a list of games which are allowed for selection by a player, and executing one of the list of games selected by the player, wherein each of the predetermined number of games is previously classified so as to belong to one of a plurality of game groups, and the game program causing a computer comprised in the game apparatus to perform:

a group point addition step of adding, in response to playing of one of the list of games by the player, predetermined points in accordance with a result of the playing to group points for the game group to which the game belongs, a game addition step of, when the group points for the game group to which one of the predetermined number of games belongs becomes equal to or greater than stipulated points prescribed for the game, newly adding the game to the list, and a selection screen generation step of generating image data for displaying the list on the display.

6. The game, program according to claim 5, wherein the group point addition step adds, concurrently with adding the predetermined points in accordance with the result of the playing to the group points for the game group to which the game belongs in response to playing of one of the list of games by the player, points fewer than the predetermined points to the group points for the other game groups.

7. The game program according to claim 5, wherein the selection screen generation step generates the image data such that the list is displayed in the form of a TV program table, with the list of games and game groups being displayed so as to correspond to programs and channels, respectively, on the TV program table.

8. The game program according to claim 7, wherein the TV program table comprises a news program for notifying information concerning progression of the game in the form of news to the player when the news program is selected by the player.

9. A game apparatus for causing a display to display, among a predetermined number of games provided, a list of games which are allowed for selection by a player, and executing one of the list of games selected by the player, wherein each of the predetermined number of games is previously classified so as to belong to one of a plurality of game groups, the game apparatus comprising:

stipulated point storage for storing stipulated points for each game, group point storage for storing group points for each game group, group point adder for adding, in response to playing of one of the list of games by the player, predetermined points in accordance with a result of the playing to the group points for the game group to which the game belongs, game adder for, when the group points for the game group to which one of the predetermined number of games belongs becomes equal to or greater than the stipulated points for the game, newly adding the game to the list games, and selection screen generator for generating image data for displaying the list of games on the display.

10. The game apparatus according to claim 9, wherein the group point adder adds, concurrently with adding the predetermined points in accordance with the result of the playing to the group points for the game group to which the game belongs in response to playing of one of the list of games by the player, points fewer than the predetermined points to the group points for the other game groups.

11. The game apparatus according to claim 9, wherein the selection screen generator generates the image data such that the list is displayed in the form of a TV program table, with the list of games and game groups being displayed so as to correspond to programs and channels, respectively, on the TV program table.

12. The game apparatus according to claim 11, wherein the TV program table comprises a news program for notifying information concerning progression of the game in the form of news to the player when the news program is selected by the player.

* * * * *